United States Patent
Shijo et al.

(10) Patent No.: US 12,040,624 B2
(45) Date of Patent: Jul. 16, 2024

(54) POWER CONDITIONING SYSTEM AND POWER GRID OPERATIONAL SYSTEM

(71) Applicant: KABUSHIKI KAISHA TOSHIBA, Tokyo (JP)

(72) Inventors: Tetsu Shijo, Tokyo (JP); Qiang Lin, Kawasaki Kanagawa (JP); Kenichirou Ogawa, Kawasaki Kanagawa (JP); Yasuhiro Kanekiyo, Yokohama Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 17/823,743

(22) Filed: Aug. 31, 2022

(65) Prior Publication Data
US 2023/0299591 A1    Sep. 21, 2023

(30) Foreign Application Priority Data
Mar. 18, 2022    (JP) .................. 2022-044078

(51) Int. Cl.
H02J 3/46    (2006.01)
H02J 3/38    (2006.01)

(52) U.S. Cl.
CPC ............... *H02J 3/46* (2013.01); *H02J 3/381* (2013.01)

(58) Field of Classification Search
CPC .................................... H02J 3/46; H02J 3/381
USPC ........................................................ 307/82
See application file for complete search history.

(56) References Cited

U.S. PATENT DOCUMENTS

| | | | | |
|---|---|---|---|---|
| 11,658,478 | B2* | 5/2023 | Yin | H02M 7/48 361/1 |
| 11,705,731 | B2* | 7/2023 | Nagakura | H02J 3/18 700/295 |
| 2021/0159702 | A1 | 5/2021 | Nagakura et al. | |
| 2021/0296883 | A1 | 9/2021 | Yin | |
| 2023/0079040 | A1 | 3/2023 | Shijo | |

FOREIGN PATENT DOCUMENTS

| | | |
|---|---|---|
| EP | 3 780 310 A1 | 2/2021 |
| JP | 3311424 B2 | 8/2002 |
| JP | 5886658 B2 | 3/2016 |
| JP | 2017-70130 A | 4/2017 |
| JP | 6284342 B2 | 2/2018 |
| JP | 2019-80476 A | 5/2019 |

(Continued)

OTHER PUBLICATIONS

J. Matevosyan et. al., "Grid-Forming Inverters: Are They the Key for High Renewable Penetration?," IEEE Power and Energy Magazine, vol. 17, No. 6, pp. 89-98 (Nov.-Dec. 2019).

(Continued)

*Primary Examiner* — Hal Kaplan
(74) *Attorney, Agent, or Firm* — Finnegan, Henderson, Farabow, Garrett & Dunner, LLP

(57) ABSTRACT

A power conditioning system includes a control circuit. The control circuit is configured to switch a output control mode to any one of a first mode in which an operation not based on inertia is executed and a second mode in which an operation based on inertia is executed, performs output control according to a first rating in the first mode, and performs output control according to a second rating different from the first rating in the second mode.

15 Claims, 8 Drawing Sheets

(56) References Cited

FOREIGN PATENT DOCUMENTS

| JP | 6551143 B2 | 7/2019 |
|---|---|---|
| JP | 2019-176584 A | 10/2019 |
| JP | 2020-25394 A | 2/2020 |
| JP | 6733799 B1 | 7/2020 |
| JP | 6735039 B1 | 7/2020 |
| JP | 2021-83277 A | 5/2021 |
| JP | 2023-43073 A | 3/2023 |

OTHER PUBLICATIONS

S. D'Arco et. al., "Virtual Synchronous Machines—Classification of Implementations and Analysis of Equivalence to Droop Controllers for Microgrids," DOI: 10.1109/PTC.2013.6652456, 8 pages (2013).

Y. Noro, "Proposal of Inverter Control Method for Electric Power System Consisting of Energy Storages," IEEJ Trans. on Power and Energy, vol. 138, No. 11, pp. 854-861 (2018).

\* cited by examiner

US 12,040,624 B2

POWER CONDITIONING SYSTEM AND POWER GRID OPERATIONAL SYSTEM

CROSS REFERENCE TO THE RELATED APPLICATIONS

This application is based upon and claims the benefit of priority from the prior Japanese Patent Application No. 2022-044078, filed on Mar. 18, 2022, the entire contents of which are incorporated herein by reference.

FIELD

Embodiments of the present invention relate to a power conditioning system and a power grid operational system.

BACKGROUND

A power generation apparatus using renewable energy such as solar power generation does not have a mechanism that converts rotation into electric power as with a synchronous generator. Therefore, for example, there is a power conditioning system (PCS) such as a virtual synchronous generator (VSG) in which control simulating inertia of a synchronous generator is incorporated in an asynchronous power source such as renewable energy power generation including solar photovoltaic energy systems and an energy storage system. In the PCS, there is a control method referred to as a grid forming (GFM) inverter that executes a voltage source operation, in contrast to a grid following (GFL) inverter that executes a conventional current source operation. The VSG control that supplies inertia and the GFM control that behaves like a power supply voltage contribute to grid stabilization.

Some synchronous generators used for thermal power generation and the like withstand a current corresponding to 1.5 times the rated current for at least about 30 seconds. In the event of a grid fault, a voltage during the fault can be secured by supplying a reactive current exceeding the rating from the synchronous generator. In addition, in order to detect a grid fault, the protection relay is operated by a fault current supplied from the synchronous generator. However, there is a problem that the VSG, and the PCS for performing the GFM control, cannot flow a current greatly exceeding the rated current.

DETAILED DESCRIPTION

According to an embodiment, a power conditioning system includes a control circuit. The control circuit is configured to switch a output control mode to any one of a first mode in which an operation not based on inertia is executed and a second mode in which an operation based on inertia is executed, performs output control according to a first rating in the first mode, and performs output control according to a second rating different from the first rating in the second mode.

Hereinafter, embodiments will be described with reference to the drawings. In the present disclosure, "equal to or higher than", "equal to or lower than", and terms indicating comparison similar thereto may be used, but these terms can be appropriately read as "higher than", "lower than", and the like within a range not contradictory to each other, respectively. The reverse is similar, and the terms "higher than" and "lower than" may be read as "equal to or higher than" and "equal to or lower than".

Figure 1:
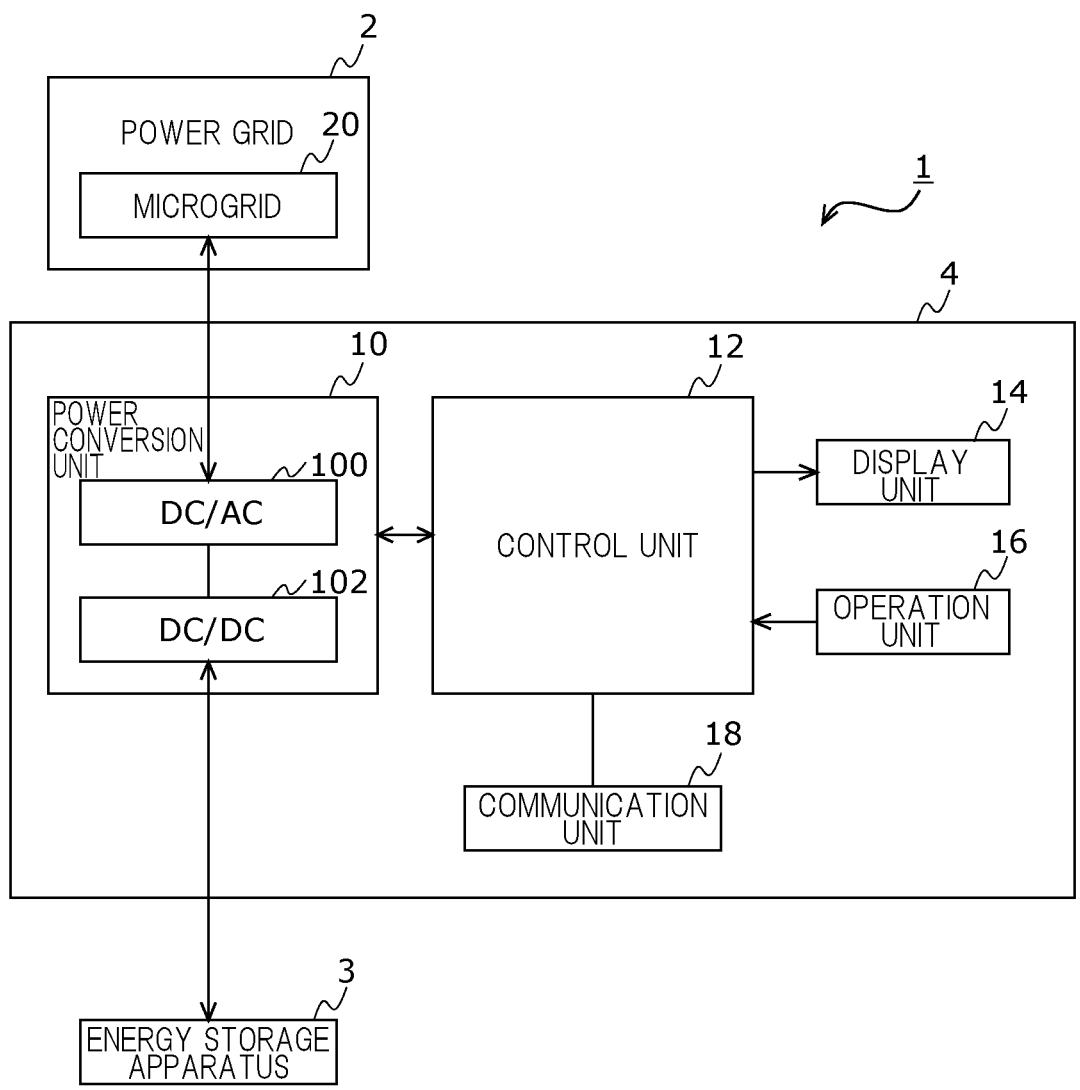
FIG. 1 is a diagram schematically showing a PCS and a power grid operational system according to an embodiment.

FIG. 1 is a diagram schematically showing an example of a power conditioning system (hereinafter, referred to as PCS) and a power grid operational system according to an embodiment. The PCS 4 includes a power conversion unit 10, a control unit 12, a display unit 14, an operation unit 16, and a communication unit 18. In a broad sense, the power grid operational system 1 may include any one of a power grid 2 including a microgrid 20 connected to the PCS 4 and an energy storage apparatus 3.

The control unit 12 executes control of the power grid operational system 1. For example, the control unit 12 controls output power in the power grid operational system 1. The control unit 12 includes, for example, a processing circuit (control circuit) (not shown) and a storage circuit. When the processing circuit is a general-purpose circuit, in the control unit 12, information processing by software may be specifically implemented using a processing circuit being a hardware resource. In this case, the storage circuit may store a program or the like by which the processing circuit achieves information processing. That is, the operation of the control unit 12 in the present disclosure can be read as the operation of the control circuit.

The power conversion unit 10 includes a DC/AC inverter 100 and a DC/DC converter 102, and converts and outputs power. The power conversion unit 10 is a device capable of executing, for example, a first operation of generating power to be output to the power grid 2 without being based on a synthetic inertia, and a second operation of generating power to be output to the power grid 2 based on a synthetic inertia.

The DC/AC inverter 100 converts a DC current into an AC current and outputs the AC current. The DC/DC converter 102 converts a DC current into a voltage value and outputs the voltage value. By using these inverter and converter, the power conversion unit 10 can convert the power stored in the energy storage apparatus 3 into an AC current based on the renewable energy and output the AC current to the microgrid 20 of the power grid 2 as necessary. As another example, instead of the energy storage apparatus 3, a power generation apparatus of renewable energy such as solar power generation or wind power generation may be connected.

In the present embodiment, the PCS 4 includes a control unit 12 and a power conversion unit 10. As another example not-limited, the PCS 4 may have a form of including at least, the control unit 12, and the DC/AC inverter 100 of the power conversion unit 10. In addition, as another example not-limited, the PCS 4 may have a form of including the display unit 14, the operation unit 16, and the communication unit 18.

The control unit 12 performs control to switch the operation of the power conversion unit 10 based on a command from a host control unit based on the state of the power grid. The control unit 12 controls output from the power conversion unit 10 by switching, at an appropriate timing, between a first mode being a output control mode in which the first operation in the power conversion unit 10 is executed and a second mode being a output control mode in which the second operation is executed.

The first mode is a output control mode in which the first operation not based on the inertia is executed, and is a mode in which the grid stabilization control is not executed in the power conversion unit 10. When the first mode is controlled, the power conversion unit 10 executes control according to a current control method for controlling the output current, for example, GFL. In the first mode, the control unit 12 executes control in which the rating becomes the first rating.

The second mode is a output control mode in which the second operation based on the inertia is executed, and is a mode in which the grid stabilization control is executed in the power conversion unit 10. When the second mode is controlled, the power conversion unit 10 changes the rating of the PCS according to at least one of the voltage control methods for controlling the output voltage, such as the VSG control, the GFM, the Frequency-Watt control, the Volt-Watt control, the Volt-var control, and the Dynamic Volt-var control. For example, in the second mode, the power conversion unit 10 may output power by a single piece of control among the above voltage control methods, or may output power by two or more pieces of control within consistent ranges, such as the VSG control and the GFM control, for example. In the second mode, the control unit 12 executes control in which the rating becomes the second rating.

Here, the Frequency-Watt control is frequency-active power control that changes the active power output according to the grid frequency. The Volt-Watt control is voltage-active power control. Volt-var control is voltage-reactive power control. The Dynamic Volt-var control is dynamic reactive power support control. These pieces of control for generating inertia in a synthetic manner are executed in the second mode.

As an example, the first rating indicates higher power or current than the second rating. Desirably, the first rating is a value 1.5 times or more the second rating. More desirably, the first rating is a value higher by a minimum value securing safety than 1.5 times the second rating. The 1.5 times is an optimum value in Japan based on the standards of JIS C 4034-1:1999 and JEC-2100-2008, and in a country with different laws or standards such as IEC 60034-1, the magnification may be desirably selected as an optimum value based on the laws, standards, or the like in the country.

The display unit 14 is a user interface capable of browsing the state of control in the control unit 12. The display unit 14 includes, for example, a display.

The operation unit 16 is a user interface with which the user can instruct the control unit 12. The operation unit 16 includes, for example, a mouse, a keyboard, a touch panel, a button, and the like.

The communication unit 18 is an interface that transmits and receives information in the control unit 12.

The command from the host control unit may be directly input to the control unit 12 through the communication unit 18, or may be input by the user from the operation unit 16.

First Embodiment

Figure 2:
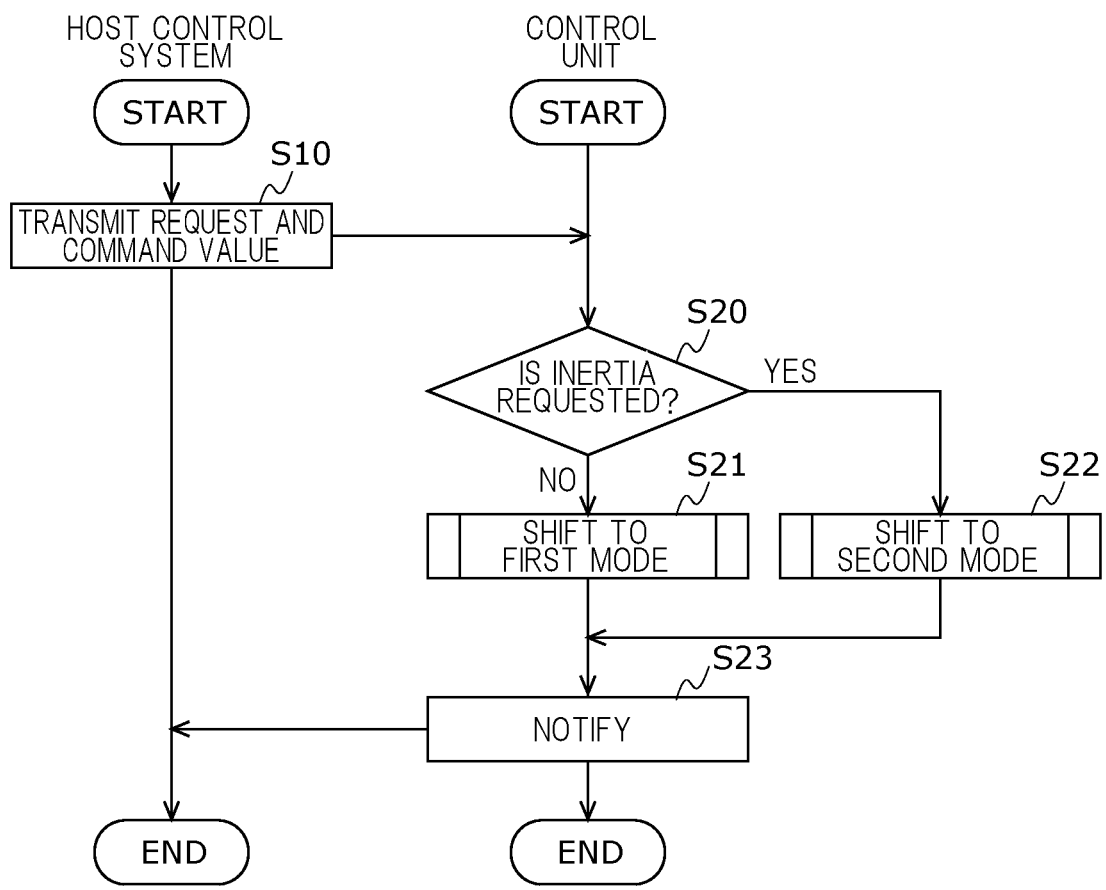
FIG. 2 is a flowchart showing a part of control of a PCS according to an embodiment.

FIG. 2 is a flowchart showing processing of the control unit 12 in the power grid operational system 1 according to the embodiment.

The host control system confirms the supply information on power, the weather, and the situation of the fault occurrence and the like, and transmits, to the control unit 12, a request for using/not using the inertia to the power grid operational system 1 and at least one command value of the active power command value and the reactive power command value (S10). The control unit 12 receives the above request and command value from the host control system. The host control system may transmit these pieces of information to the control unit 12 through the communication unit 18 in FIG. 1, or the user may input these pieces of information to the control unit 12 by inputting them through the operation unit 16.

The host control system can also transmit only the above request or only the above command value to the control unit 12. The control unit 12 can also switch the mode and the rating by the following processing based on only the received request or only the command value.

The control unit 12 determines whether the request received from the host control system is to be controlled with inertia or to be controlled without inertia (S20).

If the request does not include the inertia (NO in S20), the control unit 12 sets the output from the PCS 4 to the first mode and performs control (S21). As described above, if receiving the request without the inertia, the control unit 12 selects the first mode in which the grid stabilization control is not performed.

If the request includes the inertia (YES in S20), the control unit 12 sets the output from the PCS 4 to the second mode and performs control (S22). As described above, if receiving the request with the inertia, the control unit 12 selects the second mode in which the grid stabilization control is performed.

After setting the first mode/second mode, the control unit 12 notifies the host control system of the presence or absence of the inertia, the output, and the value of the rating (S23). In addition, the control unit 12 may notify the host control system of the present output control mode.

Figure 3:
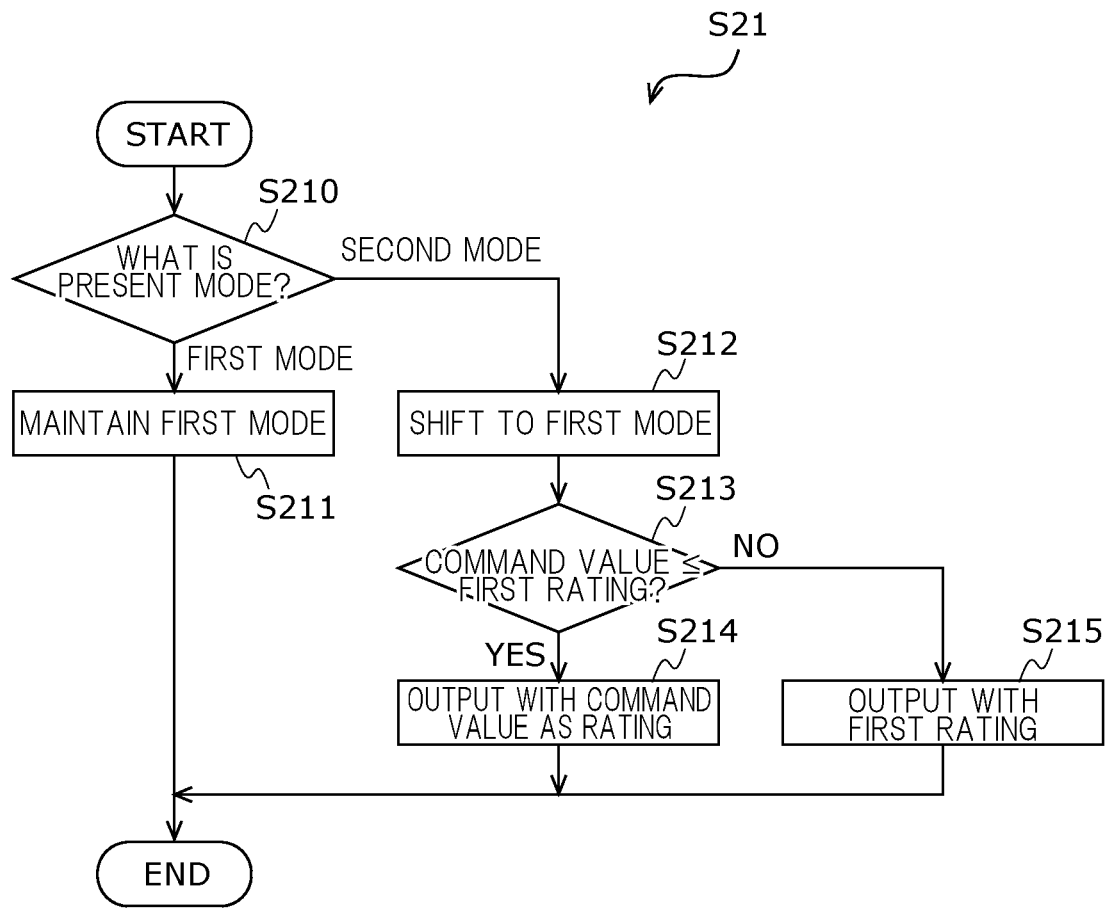
FIG. 3 is a flowchart showing a part of control of a PCS according to an embodiment.

FIG. 3 is a flowchart showing details of processing of the first mode (S21) in FIG. 2.

When determining to perform control in the first mode, the control unit 12 confirms the present output control mode (S210). If the present output control mode is the first mode (control without inertia) (FIRST MODE in S210), the control unit 12 maintains the control in the first mode (S211).

If the present output control mode is the second mode (control with inertia) (SECOND MODE in S210), the control unit 12 shifts and switches the output control mode to the first mode (S212).

After shifting to the first mode, the control unit 12 determines whether or not at least one command value of the active power command value and the reactive power command value is higher than the first rating (S213). In other words, it is determined whether or not both the active power command value and the reactive power command value are equal to or less than the first rating.

If both the command values are equal to or less than the first rating (YES in S213), the control unit 12 performs control to output power/current with the command value as the rating (S214).

If at least one of the command values is higher than the first rating (NO in S213), the control unit 12 performs control to output power/current according to the first rating (S215).

As described above, the control unit 12 controls the power output according to the rating not exceeding the first rating when control is performed in the first mode.

Figure 4:
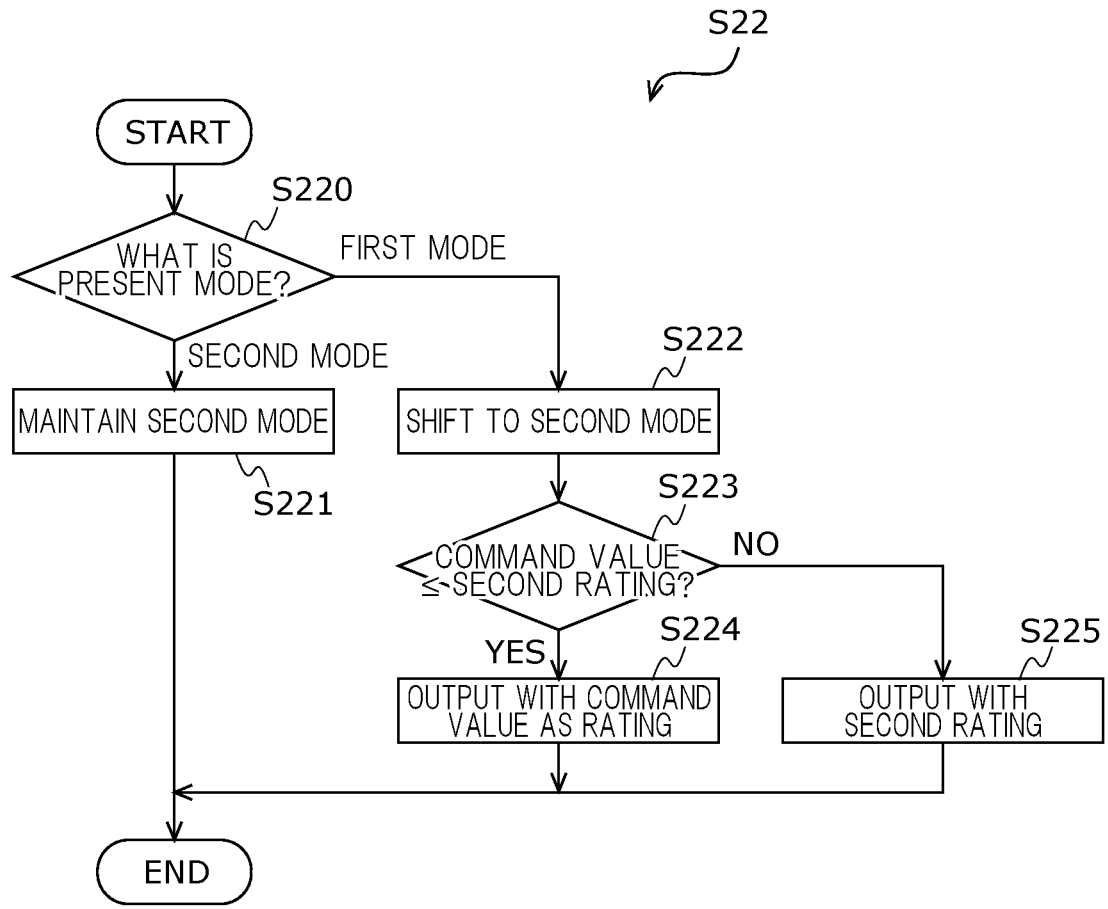
FIG. 4 is a flowchart showing a part of control of a PCS according to an embodiment.

FIG. 4 is a flowchart showing details of processing of the second mode (S22) in FIG. 2.

When determining to perform control in the second mode, the control unit 12 confirms the present output control mode (S220). If the present output control mode is the second mode (control with inertia) (SECOND MODE in S220), the control unit 12 maintains the control in the second mode (S221).

If the present output control mode is the first mode (control without inertia) (FIRST MODE in S220), the control unit 12 shifts and switches the output control mode to the second mode (S222).

After shifting to the second mode, the control unit 12 determines whether or not at least one command value of the active power command value and the reactive power command value is higher than the second rating (S223). In other words, it is determined whether or not both the active power command value and the reactive power command value are equal to or less than the second rating.

If both the command values are equal to or less than the second rating (YES in S223), the control unit 12 performs control to output power/current with the command value as the rating (S224).

If at least one of the command values is higher than the second rating (NO in S223), the control unit 12 performs control to output power/current according to the second rating (S225).

It should be noted that in order to execute more stable processing, the processing in S222 may be performed after the processing in S224 or the processing in S225. That is, after setting the value of the rating to a safe value, the control unit 12 may shift the value of the rating to the second mode to execute the grid stabilization control.

As described above, the control unit 12 controls the power output according to the rating not exceeding the second rating when control is performed in the second mode. As described above, the second rating may be, for example, a value equal to or less than ⅔ times the first rating. By setting this second rating, it is possible to sufficiently withstand the current output of 1.5 times the second rating being the rating in the second mode.

According to the flowcharts in FIGS. 2 to 4, when receiving a request to perform stabilization control during execution of control in the first mode, the control unit 12 switches the output control mode from the first mode to the second mode. Similarly, when receiving a request not to perform stabilization control during execution of control in the second mode, the control unit 12 switches the output control mode from the second mode to the first mode.

As shown in S23 in FIG. 2, the control unit 12 notifies the host control system that the mode has been switched. In particular, when shifting from the second mode to the first mode after occurrence of an abnormality (switching to the second mode) such as a grid fault, the control unit 12 notifies the host control system of having switched to the first mode being a normal operation mode. By making such a notification, when an abnormality occurs, the host control system can promptly request the control unit 12 to switch the control to the operation mode at the time of the abnormality.

As described above, according to the present embodiment, it is possible to provide a configuration capable of temporarily withstanding a current exceeding the rating in the second mode. The power grid operational system 1 has, for example, a circuit configuration capable of withstanding the output of the first rating being about 1.5 times the second rating in the second mode. Therefore, even when an abnormality such as a grid fault occurs, the power grid operational system 1 can switch from the first mode being control at the normal time in which the inertia is not used to the second mode in which the inertia is used, and can maintain an output equivalent to that of the first rating in which a malfunction such as element breakage does not occur.

Second Embodiment

Figure 5:
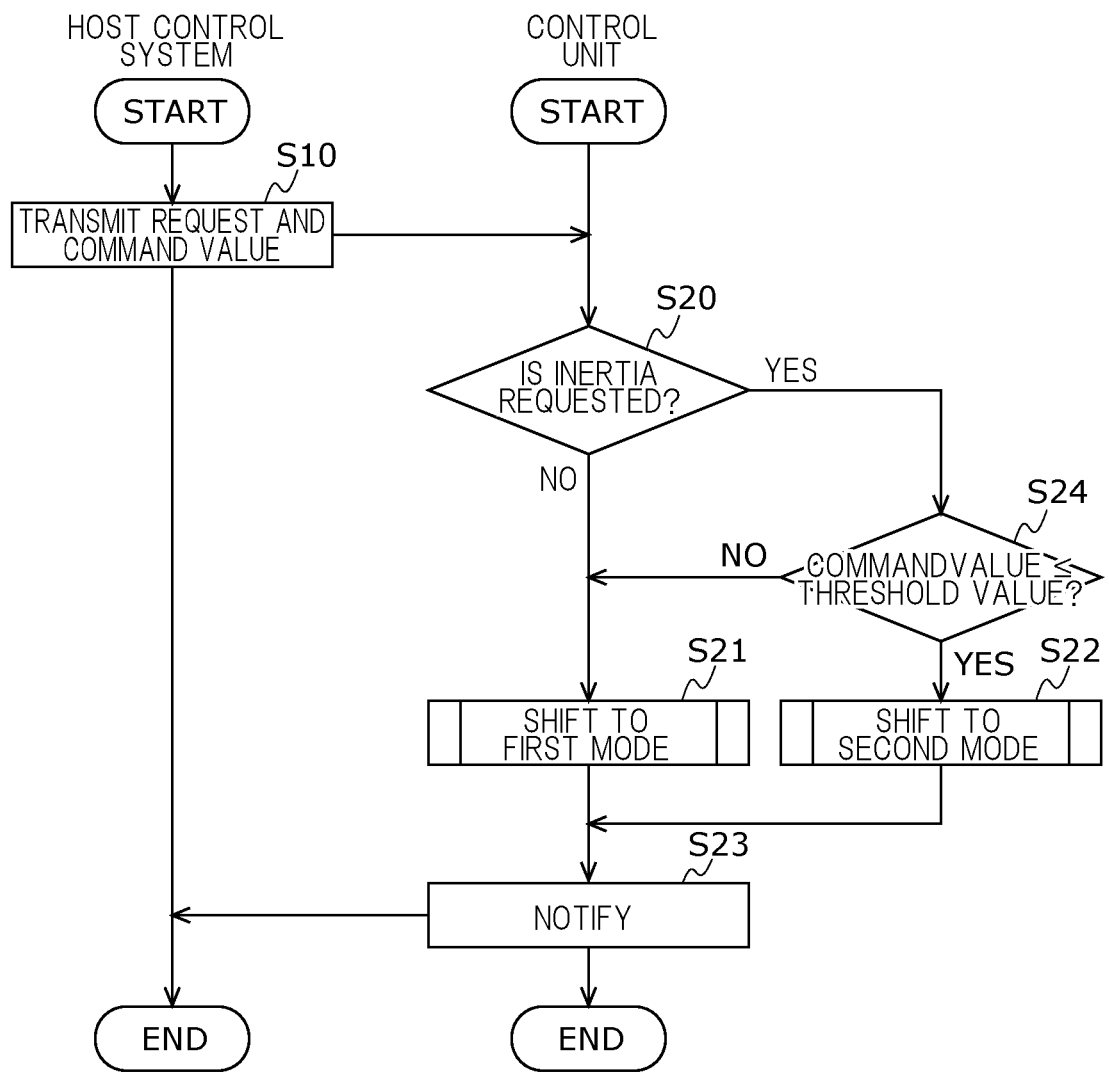
FIG. 5 is a flowchart showing a part of control of a PCS according to an embodiment.

FIG. 5 is a flowchart showing a part of the control of the PCS 4 according to the embodiment. In addition to the configuration in FIG. 2, comparison processing between a command value and a predetermined threshold value is added. Processing denoted by the same reference numeral as that in FIG. 2 is the same processing unless otherwise noted, and thus description thereof is omitted.

Before shifting to the second mode, the control unit 12 compares a command value with a predetermined threshold value (S24). Here, the predetermined threshold value is a value lower than the first rating. The predetermined threshold value may be, for example, a value satisfying (first rating)>1.5×(predetermined threshold value). Furthermore, the predetermined threshold value may be a value higher than the second rating or may be the same value as the second rating.

If the command value is less than or equal to the predetermined threshold value (YES in S24), the control unit 12 sets the output control mode to the second mode as in the above-described embodiment (S22).

If the command value is higher than the predetermined threshold value (NO in S24), the control unit 12 sets the output control mode to the first mode in which the grid stabilization control is not performed.

It should be noted that the pieces of processing in S20 and S24 may be performed in the reverse order. The control unit 12 may compare the command value with the threshold value to select the first mode, or select a state in which the mode is not limited, and determine the presence or absence of the grid stabilization control when the mode is not limited.

With the above processing, in the present embodiment, it is possible to flow the current up to the first rating beyond the predetermined threshold value when a grid fault occurs.

In the present embodiment, the second rating and the predetermined threshold value as described above can be set to the same value. In this case, in the processing of the second mode shown in FIG. 4, the control can be performed with the command value as the rating by omitting the processing in S223 and S225. The grid control can be achieved in a safe state based on the command value without defining the second rating in the second mode. That is, the processing in S22 in the present embodiment may be the same processing as in the first embodiment, or may be processing in which S223 and S225 are not performed.

Figure 6:
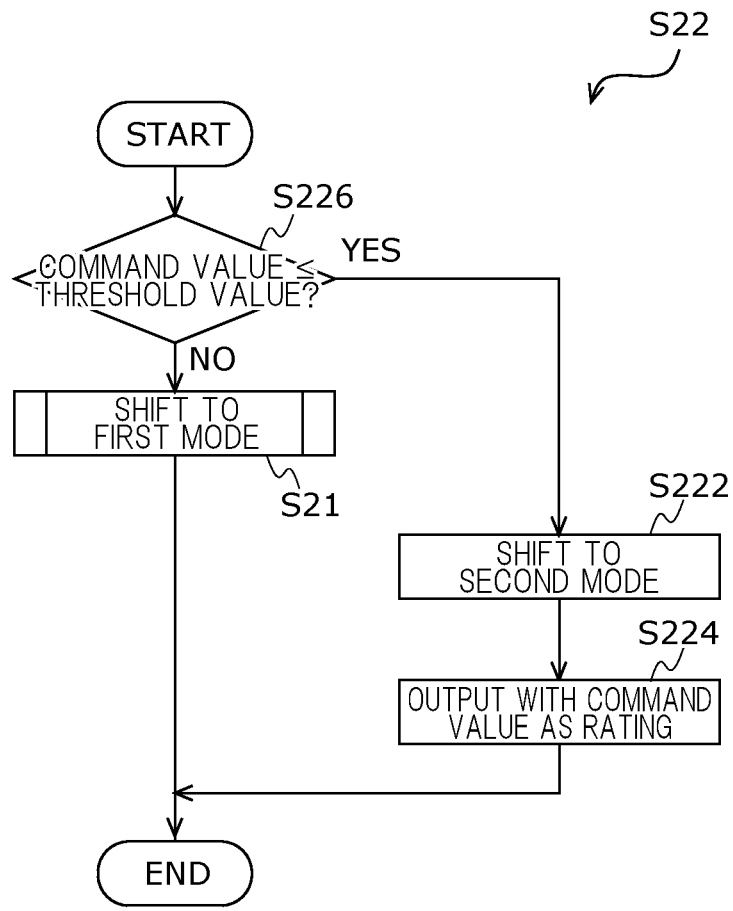
FIG. 6 is a flowchart showing a part of control of a PCS according to an embodiment.

FIG. 6 is a flowchart showing another example of the processing according to the present embodiment. The control unit 12 may perform mode selection processing similar to that in FIG. 2, compare the command value with the threshold value in S226 before starting the processing of the second mode, and select whether to switch to the first mode, maintain the first mode, or shift to the second mode. Similarly also in this case, by appropriately setting the predetermined threshold value, an output exceeding the first rating is not output in the second mode, so that the processing in S223 and S225 does not need to be performed. Of course, the processing in S223 and S225 is not excluded, and these pieces of processing may be executed.

Third Embodiment

Figure 7:
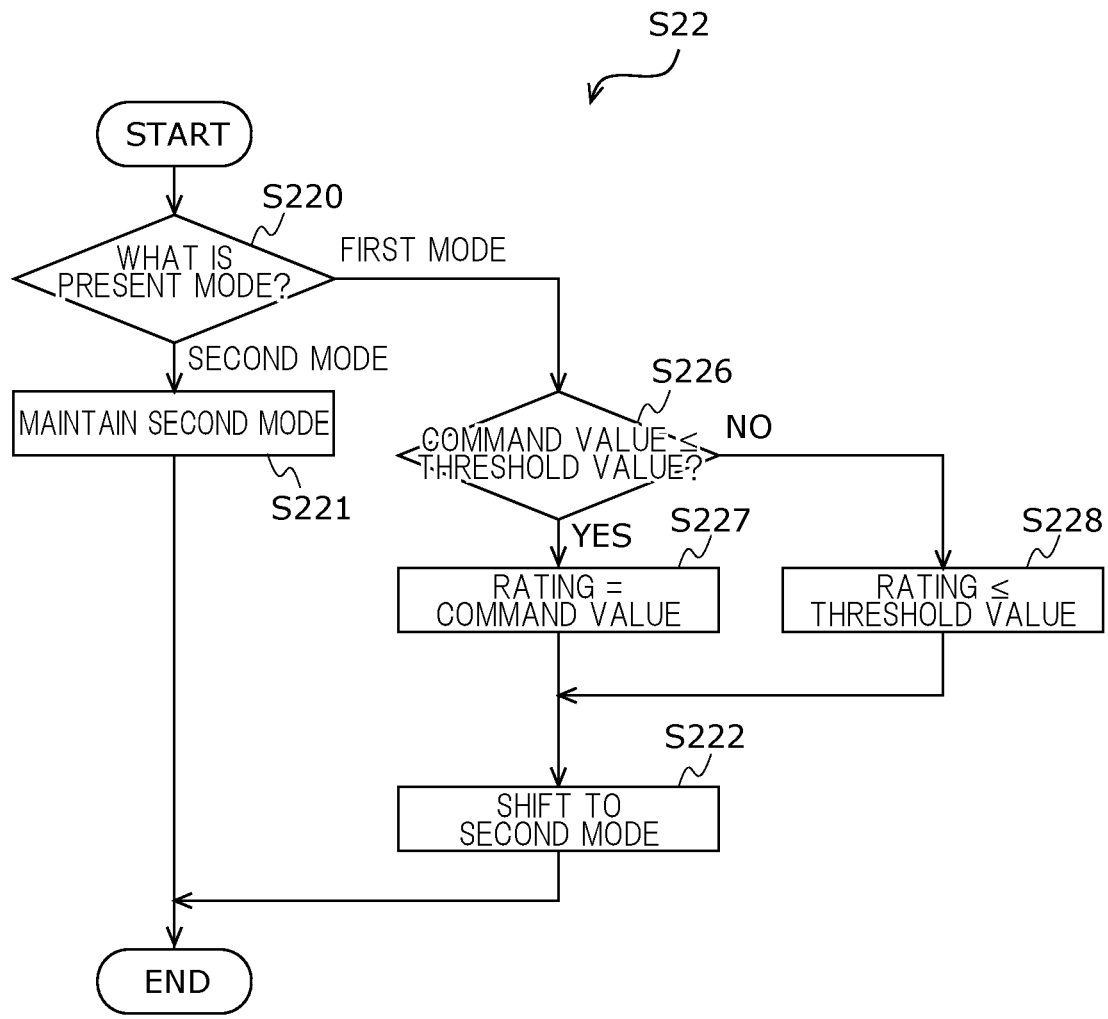
FIG. 7 is a flowchart showing a part of control of a PCS according to an embodiment.

FIG. 7 is a flowchart showing a part of the control of a PCS according to the embodiment. In the present embodiment, when a request to transition from the first mode to the second mode is received from the host control system, the control unit 12 updates the second rating based on the received command value and then shifts to the second mode. The predetermined threshold value is a value smaller than the first rating.

When receiving the request for the grid stabilization control in the processing in FIG. 2, the control unit 12 executes the processing in S22 shown in FIG. 7. If determining that the mode is the first mode (FIRST MODE in S220), the control unit 12 compares the command value with the predetermined threshold value (S226).

If the command value is less than or equal to the predetermined threshold value (YES in S226), the control unit 12 sets the command value as the rating (S227) and shifts to the second mode (S222).

If the command value is higher than the predetermined threshold value, the control unit 12 sets a value equal to or less than the predetermined threshold value as the rating (S228), and shifts to the second mode (S222).

According to the present embodiment, similarly, when the grid stabilization control is performed, the PCS can set the rated current that can be safely operated. For example, by setting the predetermined threshold value to ⅔ times the first rating, it is possible to have a configuration capable of withstanding a current output 1.5 times the rating in the second mode.

Fourth Embodiment

Figure 8:
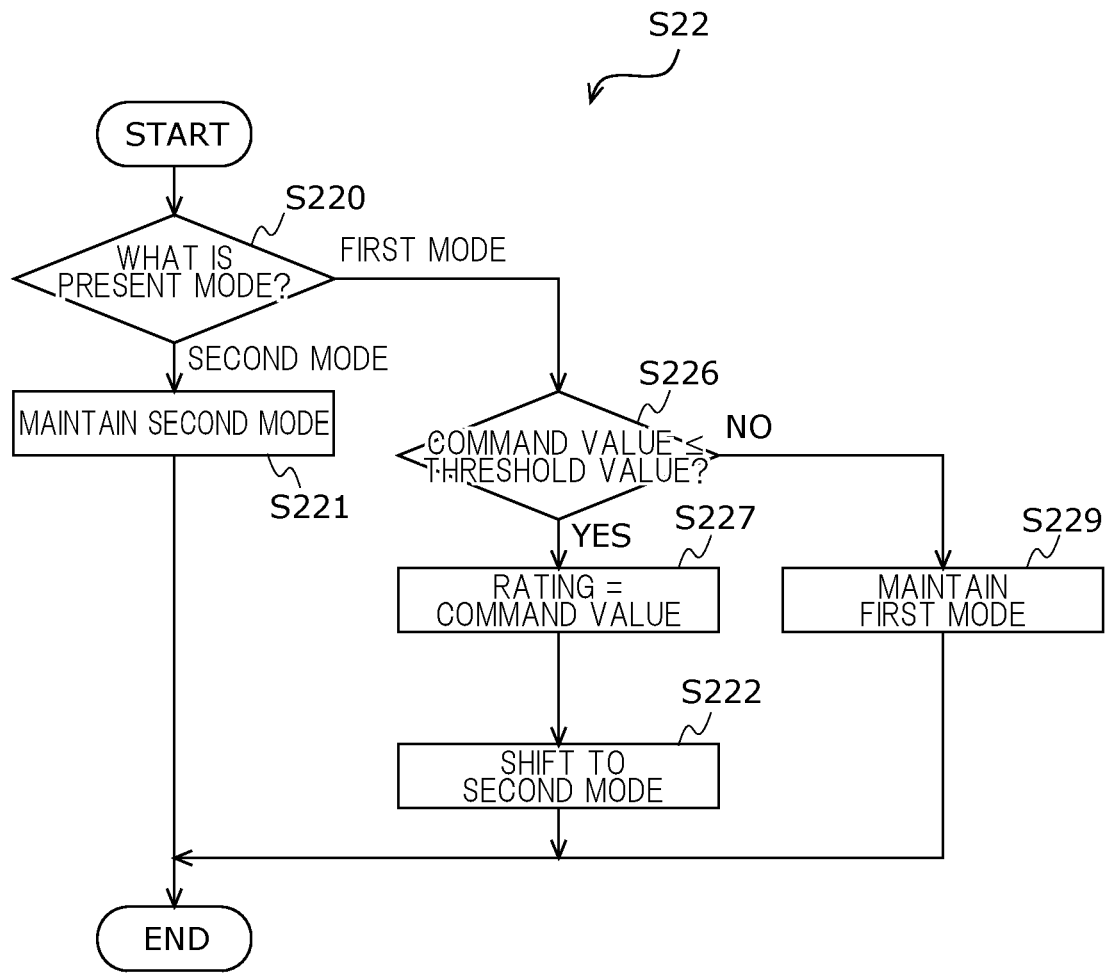
FIG. 8 is a flowchart showing a part of control of a PCS according to an embodiment.

FIG. 8 is a flowchart showing a part of the control of a PCS according to the embodiment. In the present embodiment, when a request to transition from the first mode to the second mode is received from the host control system, the control unit 12 executes processing including a case of not shifting to the second mode according to the received command value. The predetermined threshold value is the same as that in each of the above-described embodiments.

If receiving the request to transition to the second mode and the current mode is the first mode (FIRST MODE in S220), the control unit 12 compares the command value with the predetermined threshold value (S226). If the command value the threshold value (YES in S226), the processing according to any one of the above-described embodiments is executed (for example, S227).

If the command value is higher than the predetermined threshold value (NO in S226), the control unit 12 maintains the first mode regardless of the instruction from the host control system (S229).

According to the present embodiment, similarly, when the operation using the grid stabilization control is performed, it is possible to execute safe operation by appropriately selecting the first mode or the second mode.

In each of the above embodiments, the power conversion unit 10 in FIG. 1 receives from the control unit 12 at least one of instructions of virtual synchronous generator control (VSG control) and grid forming control (GFM) from the host control system, and executes power conversion based on the instruction from the control unit 12.

IMPLEMENTATION EXAMPLE

A plurality of the PCSs according to the above-described respective embodiments may be connected to the same host control system. In addition, the host control system may be provided corresponding to the microgrid 20 in FIG. 1, for example. In this case, the respective PCSs may have different ratings.

Based on the fact that the ratings of the plurality of PCSs are different depending on the presence or absence of the grid support function, that is, the presence or absence of the function of the switching between the first mode and the second mode or another grid switching, the host control system can also control the distribution of the active power command value to the respective PCSs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power conditioning system comprising a control circuit,
wherein the control circuit is configured to switch an output control mode to any one of a first mode in which an operation not based on inertia is executed and a second mode in which an operation based on inertia is executed,
wherein the control circuit performs output control according to a first rating in the first mode, and
wherein the control circuit performs output control according to a second rating different from the first rating in the second mode.

2. The power conditioning system according to claim 1, wherein the first mode is a current control method of controlling an output current, and
wherein the second mode is a voltage control method of controlling an output voltage.

3. The power conditioning system according to claim 1, wherein the first rating is higher than the second rating.

4. The power conditioning system according to claim 3, wherein the first rating is 1.5 times or more the second rating.

5. The power conditioning system according to claim 1, wherein in the first mode, when receiving a request for performing an operation based on the inertia, the control circuit switches the output control mode from the first mode to the second mode.

6. The power conditioning system according to claim 1, wherein in the second mode, when receiving a request for performing an operation not based on the inertia, the control circuit switches the output control mode from the second mode to the first mode.

7. The power conditioning system according to claim 6, wherein when switching the output control mode from the second mode to the first mode, the control circuit outputs a signal notifying a host control system that the control circuit has switched the output control mode.

8. The power conditioning system according to claim 1, wherein the control circuit receives at least one command value of an active power command value and a reactive power command value.

9. The power conditioning system according to claim 8, wherein in the first mode, the control circuit performs output control according to the first rating when the command value is higher than the first rating, and performs output control according to the command value when the command value is equal to or less than the first rating.

10. The power conditioning system according to claim 8, wherein in the second mode, the control circuit performs output control according to the second rating when the command value is higher than the second rating, and performs output control according to the command value when the command value is equal to or less than the second rating.

11. The power conditioning system according to claim 1, further comprising a power conversion unit,
wherein the control circuit outputs a signal for driving the power conversion unit according to at least one instruction of an instruction of virtual synchronous generator control and an instruction of grid forming control from a host control system, and
wherein the power conversion unit converts power based on the signal received from the control circuit.

12. A power grid operational system comprising:
one or more power conditioning systems including at least one of the power conditioning systems according to claim 1; and
a host control unit,
wherein the host control unit controls distribution of an active power command value according to a difference in ratings of the one or more power conditioning systems depending on presence or absence of a grid support function.

13. A power conditioning system comprising a control circuit,
wherein the control circuit is configured to switch an output control mode to any one of a first mode in which an operation not based on inertia is executed and a second mode in which an operation based on inertia is executed,
wherein the control circuit receives at least one command value of an active power command value and a reactive power command value, and
wherein the control circuit sets the output control mode to the first mode when the command value is higher than a predetermined threshold value lower than a first rating, the first rating is predetermined for output control in the first mode.

14. A power conditioning system comprising a control circuit,
wherein a predetermined threshold value is set to a value lower than a first rating,
wherein the control circuit is configured to switch an output control mode to any one of a first mode according to the first rating in which an operation not based on inertia is executed and a second mode in which an operation based on inertia is executed,
wherein the control circuit receives at least one command value of an active power command value and a reactive power command value,
wherein in the first mode,
when receiving a request for performing an operation based on inertia and the command value higher than the predetermined threshold value lower than the first rating, the control circuit sets a value equal to or less than the predetermined threshold value to be a second rating instead of the first rating, and
the control circuit switches the output control mode to the second mode of performing output control according to the second rating.

15. A power conditioning system comprising a control circuit,
wherein the control circuit is configured to switch an output control mode to any one of a first mode in which an operation not based on inertia is executed and a second mode in which an operation based on inertia is executed,
wherein the control circuit receives at least one command value of an active power command value and a reactive power command value,
wherein in the first mode, when receiving a request for performing an operation based on inertia and the command value higher than a predetermined threshold value lower than a first rating predetermined for output control in the first mode, the control circuit does not switch the output control mode to the second mode.

* * * * *